United States Patent Office 2,802,011
Patented Aug. 6, 1957

2,802,011

MANUFACTURE OF ALLANTOIN

Ludwig J. Christmann, Bronxville, N. Y., assignor to Carbogen Corporation, New York, N. Y.

No Drawing. Application July 23, 1956,
Serial No. 599,365

3 Claims. (Cl. 260—309.7)

This invention relates to the manufacture of allantoin, particularly to the manufacture of allantoin by the oxidation of glycoluril.

Allantoin is a compound of useful properties. It has been used as a healing agent in medicine and has also been used in cosmetics. Heretofore allantoin has been made by the oxidation of uric acid. However, uric acid is a product obtainable economically only from natural sources. It is thus available only in limited supply. The process for making allantoin form uric acid is one involving potassium permanganate as the oxidizing agent. Thus, the procedure is rather cumbersome as well as costly. It is highly desirable to have a process for making allantoin from readily available raw materials so that production may be expanded as required. It is of course also desirable that the process be simple and economical in operation. I have surveyed possible raw materials and I have come to the conclusion that glycoluril is the preferred raw material. It is readily available in almost any quantity since it can be made by a simple operation from urea and glyoxal. This latter material is easily made from ethylene glycol.

According to the literature glycoluril can be oxidized by means of hydrogen peroxide to allantoin. The most prominent reference on this reaction is that of H. Biltz and G. Schiemann, J. fpr. Ch. (2) 113, 92–93 (1926). They describe a method of producing allantoin by oxidizing glycoluril with hydrogen peroxide. The Biltz-Schiemann procedure was as follows:

8 grams of glycoluril was dissolved in 80 cc. of 6% hydrogen peroxide in 2.5 hours at 85–90° C. The mixture was kept at 85–90° for 10 hours at which time the volume was 50 cc. On cooling 1.1 grams of cyanuric acid were obtained. The filtrate evaporated to 15 cc., gave 5 grams of allantoin.

I made several attempts to repeat the above procedure. They resulted in failure. The glycoluril did not go into solution even in 10 hours and no allantoin was produced. I also increased the proportion of water to ten times the proportion used by Biltz and raised the temperature to dissolve the glycoluril and still I obtained no appreciable amount of allantoin. This is shown by Example 1.

Example 1

16 grams of glycoluril in 1575 cc. of distilled water were heated to boiling and then 25 cc. of 30% $H_2O_2$ were added. The reaction mixture refluxed for two hours. The reaction mixture was vacuum evaporated to 800 cc., cooled to 20° C., filtered and dried. 12.19 grams of glycoluril were recovered. The filtrate was vacuum evaporated to 100 cc., cooled to 20° C., filtered and dried. 0.94 gram of a product which proved to be glycoluril was obtained.

Apparently some condition pertained in Biltz's experiment of which he was unaware and which was responsible for his successful result.

I have discovered that if small amounts of a copper salt are present, the oxidation of glycoluril proceeds smoothly and good yields of allantoin may be obtained. My process is illustrated by the following examples.

Example 2

16 grams of glycoluril were suspended in 1575 cc. of distilled water containing 0.0281 gram of $CuSO_4 5H_2O$ (4.5 p. p. m. of Cu) and 0.658 gram of NaCl. 25 cc. of 30% $H_2O_2$ were added and the mixture was heated at 87° C. for two hours. The reaction mixture was vacuum evaporated to 800 cc., cooled to 20° C., filtered, and the cake dried. 3.43 grams of glycoluril were recovered. The filtrate was vacuum evaporated to 100 cc., cooled to 20° C., filtered, washed and dried. 8.44 grams of allantoin M. P. 235–236° were recovered. The yield was 60% of theory.

Example 3

16 grams of glycoluril were suspended in 1575 cc. of distilled water containing 0.0192 gram of $CuCl_2.2H_2O$ (4.4 p. p. m. of Cu). 25 cc. of 30% $H_2O_2$ were added and the mixture heated at 87° C. for two hours. The mixture was vacuum evaporated to 800 cc. and cooled to 20° C., filtered and the cake dried. 4.03 grams of glycoluril were recovered. The filtrate was vacuum evaporated to 100 cc., cooled to 20° C., filtered, the cake washed with cold water and dried. 9.13 grams of allantoin were obtained. The yield was 69% of theory.

Example 4

When the procedure of Example 3 was repeated with 0.0048 gram of $CuCl_2.2H_2O$ (1.1 p. p. m. Cu) instead of 0.0192 gram of $CuCl_2.2H_2O$, 3.73 grams of glycoluril were recovered and 9.54 grams of allantoin were obtained. The yield was 70% of theory.

Example 5

When the procedure of Example 3 was repeated with 775 cc. of distilled water containing 0.0024 gram $CuCl_2.2H_2O$ (1.1 p. p. m. Cu) and 25 cc. of 30% $H_2O_2$, 4.73 grams of glycoluril were recovered and 8.51 grams of allantoin were obtained. The yield was 68% of theory.

What I claim is:

1. Method of making allantoin comprising treating glycoluril with aqueous hydrogen peroxide in the presence of a soluble copper salt at a temperature of 80 to 100° C. for 1–4 hours, then cooling to recover unreacted glycoluril.

2. Method of making allantoin comprising treating glycoluril with aqueous hydrogen peroxide in the presence of a soluble copper salt at a temperature of 80 to 100° C. for 1–4 hours, then cooling to recover unreacted glycoluril and evaporating to recover allantoin.

3. Treating one mole of glycoluril with approximately two moles of hydrogen peroxide in the presence of water containing ½ to 10 parts of soluble copper per million of water, at a temperature of 80 to 100° C. for 1–4 hours, then cooling to recover unreacted glycoluril and evaporating to recover allantoin.

No references cited.